United States Patent
Gardner, Jr. et al.

(10) Patent No.: US 7,408,634 B2
(45) Date of Patent: Aug. 5, 2008

(54) AUTOMATED IMAGING WITH PHOSPHORESCENT IMAGING TARGETS

(75) Inventors: Richard Lynn Gardner, Jr., Greeley, CO (US); Paul C Coffin, Fort Collins, CO (US); Michael J. Chaloner, Fort Collins, CO (US)

(73) Assignee: Hewlett-Packard Development Company L.P., Houston, TX (US)

( * ) Notice: Subject to any disclaimer, the term of this patent is extended or adjusted under 35 U.S.C. 154(b) by 1071 days.

(21) Appl. No.: 09/886,444

(22) Filed: Jun. 21, 2001

(65) Prior Publication Data

US 2003/0004668 A1    Jan. 2, 2003

(51) Int. Cl.
 *G01J 1/10* (2006.01)
 *G11B 15/18* (2006.01)
 *G11B 23/03* (2006.01)

(52) U.S. Cl. .............. 356/243.1; 369/178.01; 369/69; 369/132; 720/729

(58) Field of Classification Search ............... 356/400, 356/401, 243.1, 243.4, 620, 243.3; 250/372, 250/208.1, 238, 559.11; 360/69, 132, 133; 720/729, 614, 601; 369/178.01, 120, 121; 382/132, 173
See application file for complete search history.

(56) References Cited

U.S. PATENT DOCUMENTS

| | | | |
|---|---|---|---|
| 4,945,429 A | 7/1990 | Munro et al. | |
| 5,544,146 A | 8/1996 | Luffel et al. | |
| 5,644,559 A | 7/1997 | Christie, Jr. et al. | |
| 5,682,096 A | 10/1997 | Christie, Jr. et al. | |
| 5,882,330 A * | 3/1999 | Lemelson | |
| 6,043,877 A * | 3/2000 | Land | |
| 6,091,563 A * | 7/2000 | Thomas et al. ............. 360/69 |
| 6,118,598 A | 9/2000 | Gardner, Jr. | |
| 6,160,786 A | 12/2000 | Coffin et al. | |
| 6,164,543 A | 12/2000 | Kato et al. | |
| 6,194,697 B1 | 2/2001 | Gardner, Jr. | |
| 6,246,642 B1 | 6/2001 | Gardner, Jr. et al. | |
| 6,265,705 B1 | 7/2001 | Gardner, Jr. | |
| 6,331,714 B1 | 12/2001 | Gardner, Jr. et al. | |
| 6,366,707 B1 | 4/2002 | Gardner, Jr. et al. | |
| 6,385,142 B1 * | 5/2002 | Kobayashi ............ 369/30.01 |
| 6,531,283 B1 * | 3/2003 | Kingsmore et al. | |

FOREIGN PATENT DOCUMENTS

| EP | 0 624 636 | 11/1994 |
|---|---|---|
| EP | 0700980 A1 | 3/1996 |
| EP | 0762309 A2 | 3/1997 |
| EP | 1045301 A2 | 10/2000 |
| EP | 1045328 A2 | 10/2000 |
| EP | 1045330 A2 | 10/2000 |

(Continued)

OTHER PUBLICATIONS

European Search Report for Serial No. 01126143.5 dated Jun. 11, 2002.

(Continued)

*Primary Examiner*—Layla G. Lauchman

(57) ABSTRACT

The present invention discloses a system and method for providing an automated imaging system comprising an illumination source, a phosphorescent imaging target, and an optical imaging sensor for receiving luminance information emitted from the phosphorescent imaging target.

15 Claims, 4 Drawing Sheets

FOREIGN PATENT DOCUMENTS

| | | |
|---|---|---|
| JP | 7-271896 | 10/1995 |
| JP | 9-33208 A | 2/1997 |
| JP | 11-248422 A | 9/1999 |
| WO | WO00/12229 | 3/2000 |

OTHER PUBLICATIONS

EPC Communication dated Jul. 25, 2003, pp. 1-4.
EPC Communication dated Apr. 16, 2004, pp. 1-5.
EPC Communication dated May 30, 2003, pp. 1-4.

* cited by examiner

AUTOMATED IMAGING WITH PHOSPHORESCENT IMAGING TARGETS

TECHNICAL FIELD

The present invention relates in general to automated imaging devices and, more specifically, to imaging targets for automated imaging systems.

BACKGROUND

Improvements in robotic technologies has increased the level of automation in many industries. From the automobile industry to the semiconductor manufacturing industry, robotic technology has automated many of the repetitive tasks formerly performed by humans. A benefit of the mechanical automation is the precision achievable by computer-controlled automated systems. For automated alignment or operational robotic systems, the programming of such robots is typically extensive, with much of the physical processing of the automated systems tied to the precise locations and measurements of the automated system and the objects on which it operates.

In order to maintain precision, an automated alignment system is usually either (a) locked into a rigid positional frame of reference or (b) capable of "seeing" the objects and adjusting its positioning and processing to the objects' orientation. Because maintaining a rigid frame of reference as a sole imaging or alignment method typically requires considerable effort, "sight"-automated systems, which typically have a combination of a fixed frame of reference and sighting means, are generally more reliable and economical to employ.

One successful method for building a "sight"-automated system has been to provide an automated system, such as an autochanger for large-scale computer storage, with an illumination source and optical sensing components. Imaging targets are typically affixed to the objects to provide a reflection point for the illumination source and image sensors of the system. The imaging targets are normally white in order to maximize the contrast between the background equipment and the target. As the illumination source shines or radiates over the white imaging target, optical sensors pick up the change in the reflected light based on the large contrast between the target and the background. In some applications, the imaging targets may also include bar codes, thereby providing an intelligence to the optical sensing.

Still other applications may take advantage of a combination of both plain imaging targets and bar codes. Such systems use the plain imaging target to align with the object. The optical sensors are then generally able to read the bar code to determine whether the object is the correct target object. Furthermore, the bar codes may provide an initial reference to the automated system that indicates a general area of the system to which the automated sensor must generally move.

For example, multiple tapes of electronic information may be stored in magazines cataloged by bar code and stacked in racks or shelves. Each shelving unit generally has an imaging target used by the automated system to pinpoint different locations on the shelf. In such systems, a single illumination source and optical sensor is used to lock onto both the imaging target and the bar codes. This combination generally simplifies the design of the automated system and reduces operating costs. However, problems generally arise as the illumination source is positioned farther from the imaging target. Because only a single illumination source and optical sensor are used to image both elements, it may be positioned in such a manner to image one element more easily than the other or in such a manner to read both elements with the same, but non-optimal, difficulty. In typical embodiments, the illumination source and optical sensors are normally positioned to provide accurate reading of each individual tape's bar code. Thus, the greater distance between the illumination source and the general imaging target may sometimes cause failed or inaccurate detection by the optical sensing device. This problem could be alleviated by manufacturing a dual illumination source and optical sensor, or by increasing the size and intensity of the illumination source and/or the size and sensitivity of the optical sensor. However, both of these options add cost and complexity to the automated systems.

Furthermore, the white imaging targets frequently fail to provide adequate return radiation to register on the optical sensor. This failure may be caused by a background material that is glossy or shiny, creating a reflection comparable to the white imaging target. The failure to may also be caused by the particular shape of the object at the point on which the imaging target is affixed. If the object's facing is curved or angles away from the illumination source, the optical sensor may not register sufficient light reflection or contrast from the imaging target.

SUMMARY OF THE INVENTION

Because of the problems found in the current systems, it would be advantageous to have an imaging target capable of providing a high degree of return radiation. The present invention is directed to a system and method for providing an automated imaging system comprising an illumination source, a phosphorescent imaging target, and an optical imaging sensor for receiving luminance information emitted from the phosphorescent imaging target.

DETAILED DESCRIPTION

Figure 1A:
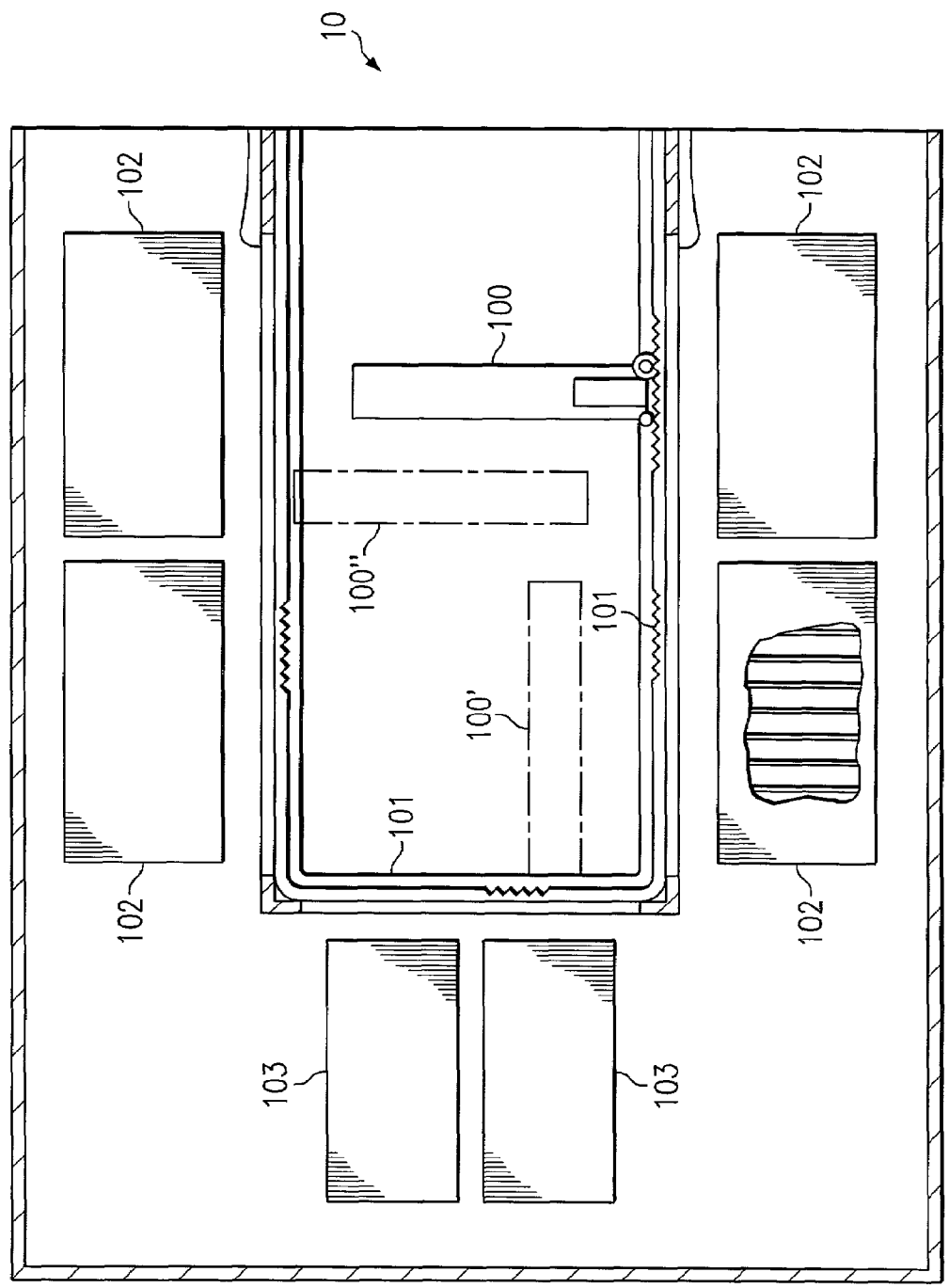
FIG. 1A is a block diagram illustrating a prior art autochanger.

FIG. 1A illustrates a prior art autochanger typically used for mass computer storage of memory tapes and/or optical disks. Autochanger 10 comprises mechanical picker 100 which travels in a 'U'-shaped path on track 101. The storage media units are housed in shelves 102, which may be stacked one on top of the other, or may be housed in single story units. As mechanical picker 100 selects the desired storage media units, the media units are placed into drives 103 to provide access to the data stored thereon. Mechanical picker 100 retrieves storage media units from shelves 102 at many possible positions, such as positions 100 and 100". The retrieved media units would then typically be placed into one of drives 103 at several possible positions, such as position 100'. With the setup illustrated in autochanger 10, mechanical picker 100 moves across track 101 to pick the targeted storage units and then insert them into drives 103, or to retrieve the units from drives 103 and return them to their designated positions in shelves 102.

Figure 1B:
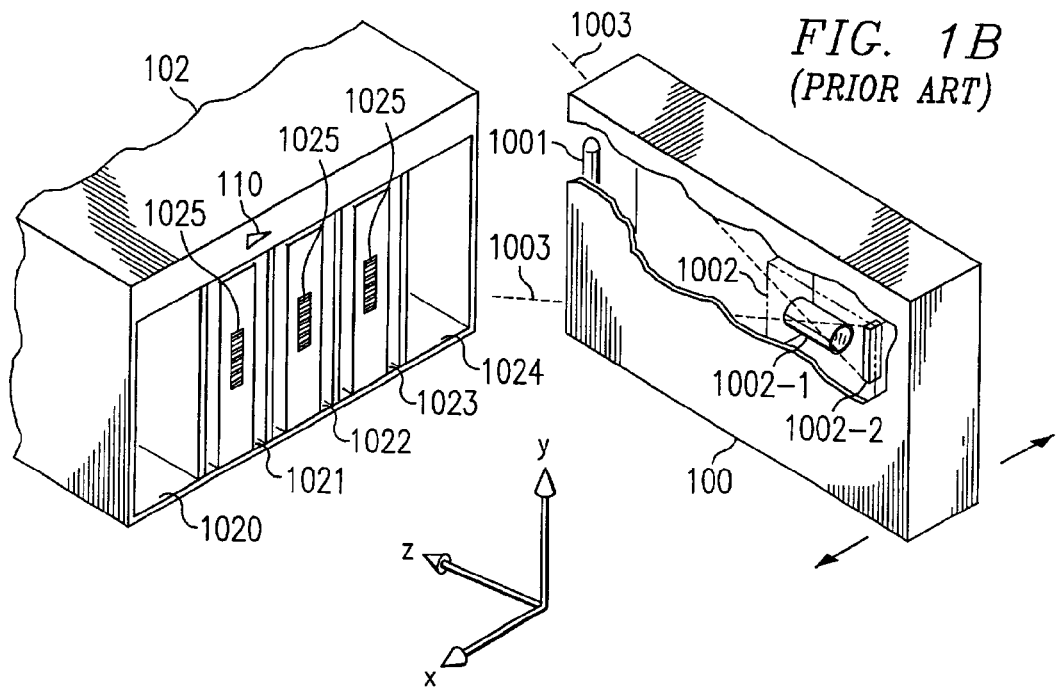
FIG. 1B is a detailed block diagram illustrating the picking mechanism and the imaging system of the autochanger of FIG. 1A used with the colored imaging targets.

FIG. 1B provides a more detailed illustration of mechanical picker 100 and shelving unit 102 of autochanger 10, from FIG. 1A. In the prior art embodiment shown, the auto-changing system uses both a positional imaging target, target 110, and an informational imaging target, bar codes 1025. Shelf 102 is shown with a capacity for holding storage media units, three of which, 1021-1023, are filled with storage media units, and two of which, 1020 and 1024, are empty. Target 110 is affixed to shelf 102 to provide mechanical picker means for calculating its relative position in front of shelf 102.

It should be noted that while shelf 102 is shown here with a five tape capacity, the present invention is not limited to such types of storage shelves. Alternative embodiments of the present invention may preferably operate with any number of different automated systems including other large-scale storage systems with varying storage capacities.

Mechanical picker 100 includes illumination source 1001, which typically comprise light emitting diodes (LEDs) or the like, to shine light onto target 110 and/or bar codes 1025. Optical sensor 1002, which comprises lens 1002-1 and optical sensor array 1002-2, receives reflected light from any of target 110 and/or bar codes 1025. Optical sensor array 1002-2 may comprise charge coupled devices (CCDs), contact image sensors (CISs), or other known optical imaging sensors. Optical sensor 1002 acts as a bar code reader to read the information from bar codes 1025. It also reads target 110 to determine machine picker 100's relative position at shelf 102.

In the prior art system depicted in FIG. 1B, target 110 is a right triangle. The locations of each tape or media unit in shelf 102 are generally known to be a certain distance from the apex of the triangle of target 110. Thus, if the position of the apex is known, mechanical picker 100 is typically capable of locating any tape or storage unit in shelf 102, simply by performing measured movements. The location process begins by performing vertical scans of the triangle to obtain its changes in height from one point to the next. After at least two such scans, the slope can be calculated using the known changes in triangle height. The system then uses the slope to predict and find the position of the triangle apex of target 110.

As shown in FIG. 1B, target 110 is typically placed at the edge of the range of optical sensor 1002. Lens 1002-1 has a limited field of vision, shown by periphery 1003. The light reflected into periphery 1003 generally is focused onto optical sensor array 1002-2 for detection. Illumination from illumination source 1001 begins to fade at the edges of periphery 1003. Using the colored targets of target 110 and bar codes 1025, the fading illumination at the edge of periphery 1003 generally causes little light to reflect back from target 110. Furthermore, the typical angle of incidence of light hitting target 110 also contributes to the diminished level of light typically reflected into periphery 1003. With a low amount of reflected light re-entering periphery 1003, system 10 often has a difficult time determining whether the reflected light is from target 110 or from the background shelf 102.

Figure 2A:
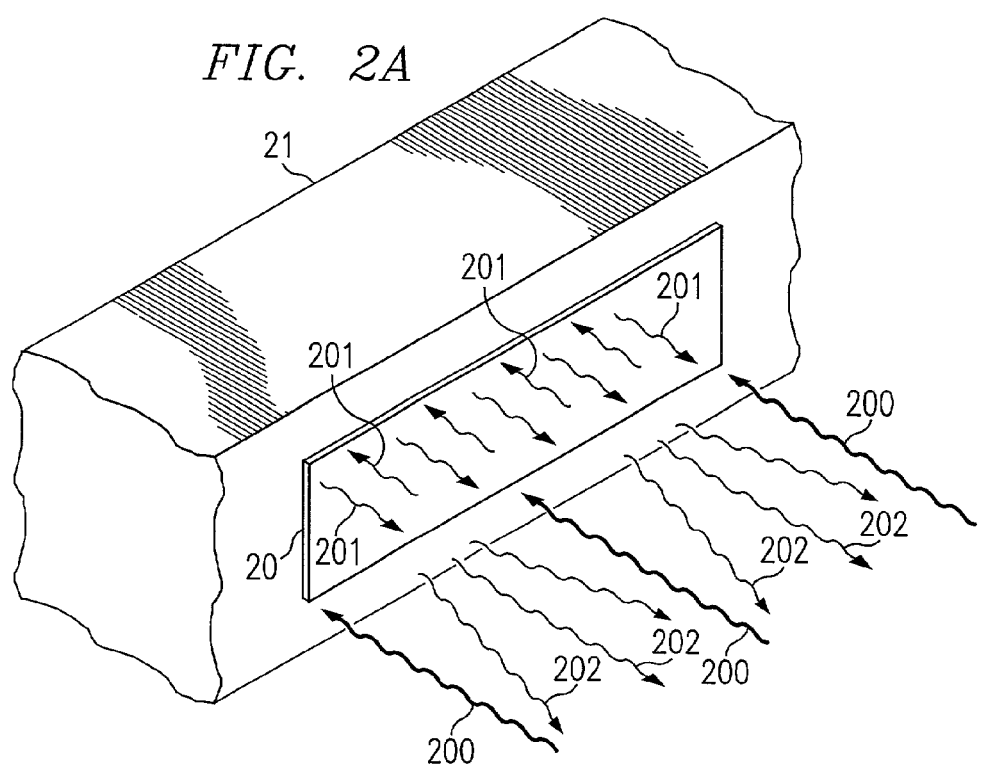
FIG. 2A is a close-up diagram of a phosphorescent imaging target configured according to a preferred embodiment of the present invention.

FIG. 2A is a detailed illustration of a phosphorescent imaging target according to a preferred embodiment of the present invention. Phosphorescent target 20 is preferably affixed to object 21, which may be an item such as shelf 102 of FIG. 1A or 1B. As phosphorescent target 20 is illuminated with light photons 200, the phosphor material of phosphorescent target 20 absorbs some of the light energy, which, in turn, preferably excites atoms 201 within phosphorescent target 20. As a result of the phosphorescence of the material, some of the light energy radiated at phosphorescent target 20 is preferably re-radiated out of phosphorescent target 20. The re-radiated photonic illumination 202, thus, preferably creates a temporary illumination source out of phosphorescent target 20.

Figure 2B:
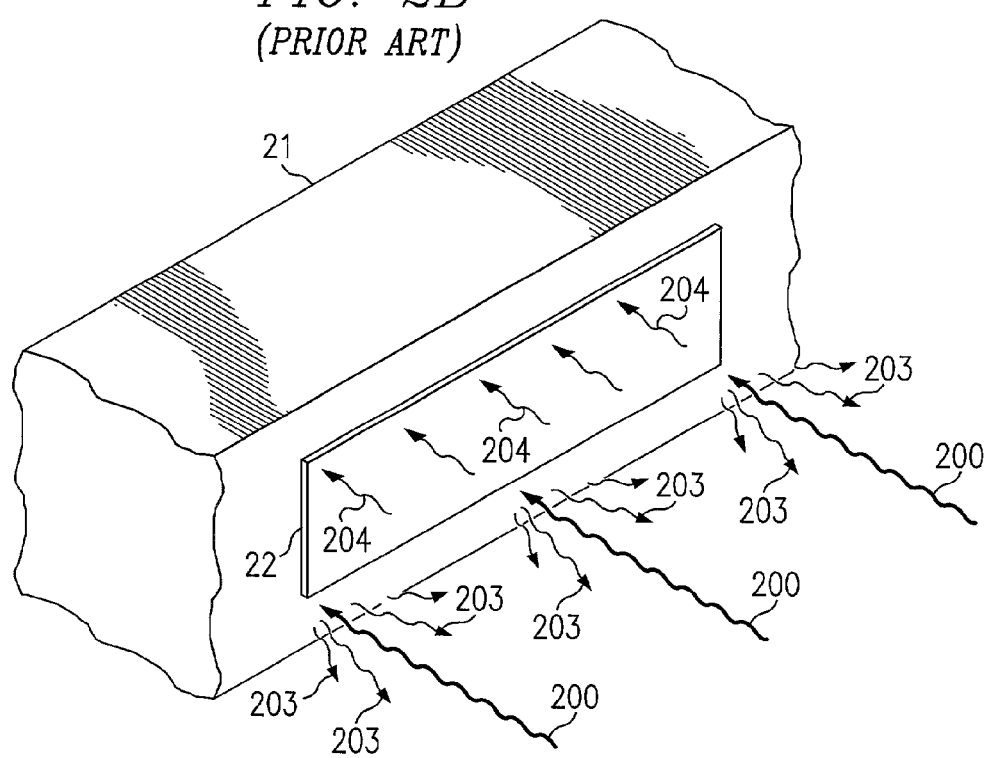
FIG. 2B is a close-up diagram of a prior art colored imaging target.

In contrast, FIG. 2B illustrates an example prior art colored imaging target. The colored target is typically white to maximize contrast against the background. White target 22 is affixed to object 21, which may be an item such as shelf 102 of FIG. 1A or 1B. In contrast to phosphorescent target 20 (FIG. 2A), as white target 22 is illuminated with light photons 200, some of the light energy is absorbed into white target 22. However, without the ability to have its atoms 204 excited to the same level as the phosphorescent material of the present invention, light is merely reflected or redirected from white target 22 in dispersive light patterns 203. While re-radiated photonic illumination 202 of phosphorescent target 20 (FIG. 2A) provides relatively strong, relatively coherent re-radiated light energy, dispersive light patterns 203 (FIG. 2B) provide a much weaker aggregate of reflected light. Because of the phosphorescent attributes of phosphorescent target 20, a strong return signal is beneficially produced, thus, making it easier for an optical sensor to register the re-radiated light.

Figure 3:
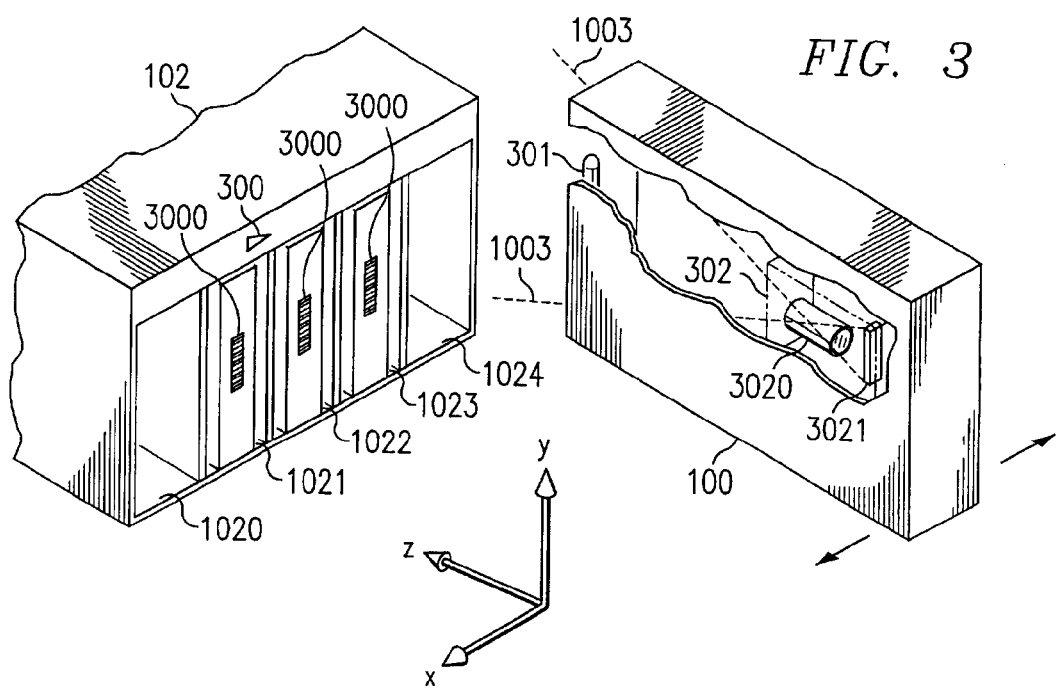
FIG. 3 is a block diagram illustrating an autochanger configured according to a preferred embodiment of the present invention.

FIG. 3 is a detailed illustration showing components of an autochanger configured according to a preferred embodiment of the present invention. Similar to the autochanger depicted in FIG. 1B, the autochanger of FIG. 3 comprises shelf 102 with storage columns 1020-1024 and mechanical picker 100. However, the imaging targets of the autochanger according to this preferred embodiment of the present invention incorporate phosphorescent triangle 300 and phosphorescent bar codes 3000. Using the phosphorescent characteristics of triangle 300 and bar codes 3000, optical sensor 302 may preferably be comprised of less sensitive, smaller, and, thus, less expensive components. Optical sensor 302 would preferably comprise modified lens 3020 and modified sensor array 3021. Similarly, modified illumination source 301 may preferably be smaller or may preferably comprise a light source of smaller intensity.

In operation, as mechanical picker 100 performs its initial vertical scans of triangle 300, the stronger re-radiated photonic illumination emitted from triangle 300 is more easily registered by modified sensor array 3021 through periphery 1003. Because the surrounding background material does not fluoresce, modified sensor array 3021 may preferably differentiate the strong luminance information re-radiated from triangle 300 from the less-intense reflected light from the background material of shelf 102, even with a smaller, modified illumination source 301 and less-sensitive optical sensor 302.

Operating in this manner, optical sensor 302 would preferably be capable of not only reading bar codes 3000, but may also preferably be capable of detecting the presence of any given tapes, on which bar codes 3000 may be disposed. Thus, as mechanical picker 100 is directed to a tape located in shelf 1021, the luminance information reflected from bar code 3000 on the tape signals the presence of the tape in shelf 1021. Additionally, as mechanical picker 100 is directed to a location of another particular tape, for example shelf 1024, the lack of luminance information reflected from one of bar codes 3000 would preferably indicate that the desired tape is not resident in the designated location of shelf 1024.

Optical sensor 302 would also preferably be capable of reading bar codes 3000 more easily because of their phosphorescent material. However, it should be noted that bar codes 3000 are not required to be constructed with phosphorescent material. It should also be noted that phosphorescent imaging targets may be used with any number of different automated systems. Systems such as robotic welders, automated conveyor systems, and/or automated counters may also benefit from a preferred embodiment of the present invention.

It should also be noted that while FIG. 3 illustrates an autochanger utilizing the right triangle for determining the mechanical pickers positional relationship to the storage shelve, the present invention is not limited to automated systems which employ such methods of positional orientation determination. Many different means, including additional bar codes may be used along with alternative embodiments of the present invention.

Figure 4:
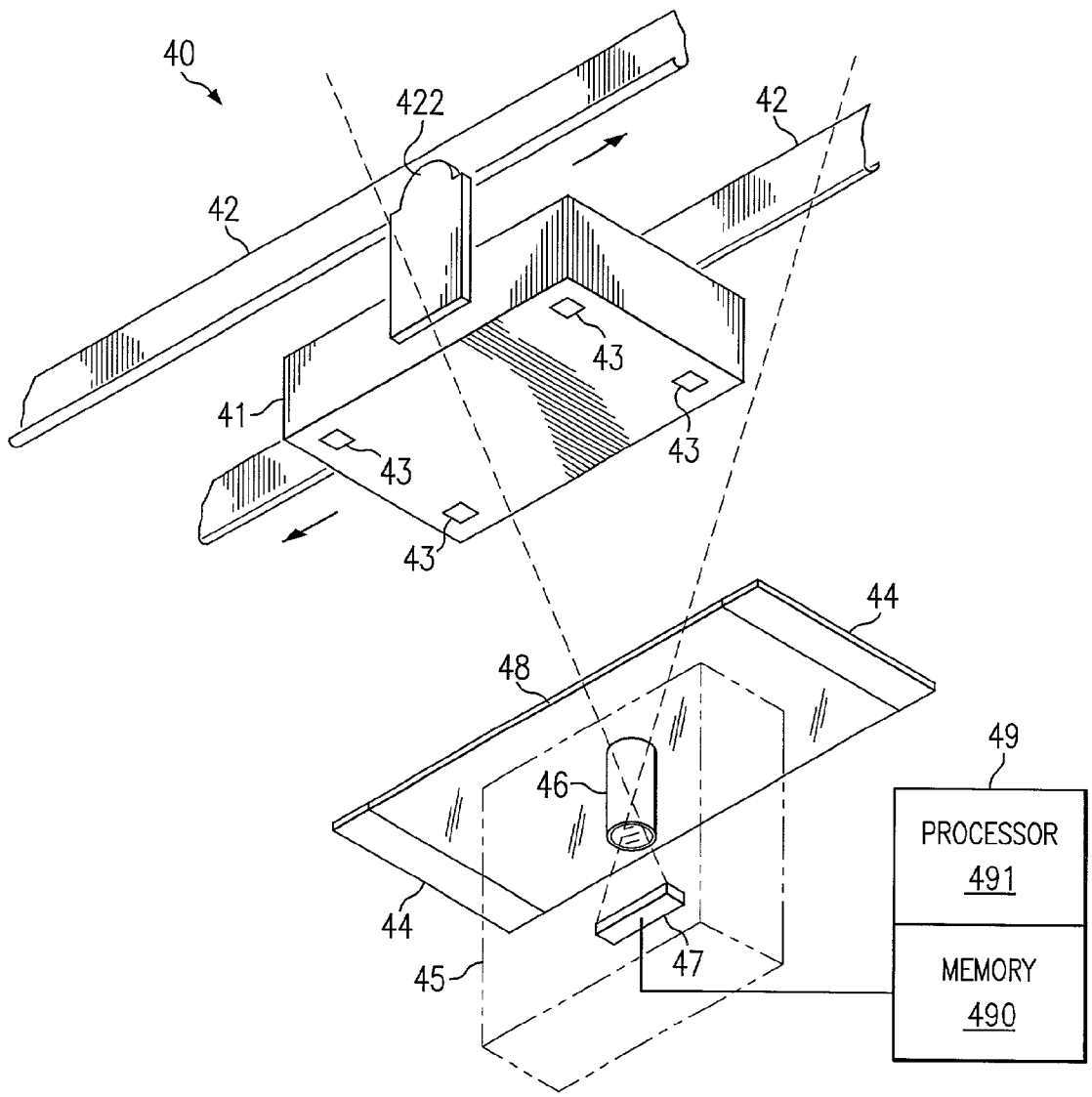
FIG. 4 is a block diagram illustrating an auto-mechanical alignment system configured according to a preferred embodiment of the present invention.

FIG. 4 illustrates an auto-mechanical optical alignment system. Unlike the autochangers of FIGS. 1A, 1B, and 3, auto-alignment system 40 of FIG. 4 moves the targeted object over the imaging equipment. Object 41 is held on maneuvering arm 42 with bracket 422. Object 41 includes phosphorescent imaging targets 43 located in known positions. Maneuvering arm 42 moves object 41 across stationary optical sensor 45. Optical sensor 45 comprises lens 46 and optical array 47. Illumination sources 44 provide the seed light energy for phosphorescent imaging targets 43. As object 41 passes over optical sensor 45, light energy from illumination sources 44 passes through window 48. The light energy is absorbed by phosphorescent imaging targets 43 and re-radiated out from each target as object 41 continues over the sensing area. Controller unit 49 receives the luminance information from optical array 47 through memory 490. Memory 490 supplies the luminance information to processor 491 in order to calculate object 41's positional orientation.

One application of auto-alignment system 40 could be to provide laser etching of a pre-milled putter head. As a block of solid metal, such as titanium, aluminum, and/or steel passes over optical sensor 45, phosphorescent imaging targets 43 preferably provide controller unit 49 with luminance information to calculate object 41's positional orientation. Controller unit 49 then preferably controls maneuvering arm 42 to position object 41 in the appropriate orientation over an etching laser (not shown). Once correctly positioned, the etching laser would preferably etch a design or name onto the pre-milled block of metal.

It should be noted that alternative embodiments of the present invention may also be used in a variety of automated systems. For example, and not by way of limitation, simple counters may preferably use the phosphorescent imaging targets of the present invention to count the number of objects passed over the optical sensors. Referring to FIG. 4, as object 41 is moved over optical sensor 45 the light energy re-radiated from imaging targets 43 is preferably detected and received by processor 491 as re-radiated photonic illumination from optical array 47 through memory 490. In response to the received re-radiated photonic illumination, processor 491 may preferably increment a counter for detecting the number of objects that have passed over optical sensor 45. Such an alternative embodiment will, therefore, be capable of keeping track of the number of objects processed through the system.

What is claimed is:

1. An autochanger comprising:
   a shelf to house storage media units;
   an illumination source;
   a phosphorescent imaging target affixed to at least one of a storage media unit and the shelf;
   an optical imaging sensor for receiving luminance information emitted from said phosphorescent imaging target; and
   a picker to be positioned based on the received luminance information emitted from the phosphorescent imaging target, the picker to retrieve a selected one of the storage media units from the shelf.

2. The autochanger of claim 1 further comprising:
   a processor for analyzing said luminance information.

3. The autochanger of claim 1 wherein said received luminance information determines an alignment of said picker relative to the storage media units and shelf.

4. The autochanger of claim 1, wherein the illumination source and optical imaging sensor are part of the picker.

5. The autochanger of claim 1, wherein said illumination source is moveable in relation to said phosphorescent imaging target.

6. The autochanger of claim 1, wherein the phosphorescent imaging target is affixed to the shelf, and a bar code is affixed to each of the storage media units.

7. The autochanger of claim 6, wherein each bar code is phosphorescent.

8. The autochanger of claim 1, wherein said received luminance information determines a position of said picker relative to the storage media units and shelf.

9. The autochanger of claim 1, wherein said received luminance information determines a presence of a storage media unit.

10. The autochanger of claim 1, wherein the picker is moveable among different positions in the autochanger.

11. The autochanger of claim 1, wherein the illumination source is to emit light onto the phosphorescent imaging target.

12. A method for use in an autochanger having a shelf to house storage media units, comprising:
   radiating photonic illumination onto a phosphorescent target affixed to at least one of a storage media unit and the shelf;
   positioning a picker based on luminance information emitted from the phosphorescent target; and
   retrieving, by the picker, a storage media unit from the shelf.

13. The method of claim 12, wherein the phosphorescent target is affixed to the shelf, the method further comprising:
   illuminating bar codes affixed to the storage media units; and
   detecting for presence of the storage media units based on illumination of the bar codes.

14. The method of claim 13, wherein illuminating the bar codes comprises illuminating phosphorescent bar codes.

15. The method of claim 12, further comprising:
   moving the picker among different positions in the autochanger.

* * * * *